US011509969B2

(12) United States Patent
Verma

(10) Patent No.: US 11,509,969 B2
(45) Date of Patent: *Nov. 22, 2022

(54) METHODS, SYSTEMS, AND APPARATUSES TO RESPOND TO VOICE REQUESTS TO PLAY DESIRED VIDEO CLIPS IN STREAMED MEDIA BASED ON MATCHED CLOSE CAPTION AND SUB-TITLE TEXT

(71) Applicant: SLING MEDIA PVT LTD, Bangaluru (IN)

(72) Inventor: Mayank Verma, Bangalore (IN)

(73) Assignee: DISH Network Technologies India Private Limited

( * ) Notice: Subject to any disclaimer, the term of this patent is extended or adjusted under 35 U.S.C. 154(b) by 0 days.

This patent is subject to a terminal disclaimer.

(21) Appl. No.: 17/329,679

(22) Filed: May 25, 2021

(65) Prior Publication Data
US 2021/0281920 A1 Sep. 9, 2021

Related U.S. Application Data

(63) Continuation of application No. 16/791,347, filed on Feb. 14, 2020, now Pat. No. 11,032,620.

(51) Int. Cl.
*H04N 21/482* (2011.01)
*G10L 15/183* (2013.01)
(Continued)

(52) U.S. Cl.
CPC ....... *H04N 21/4828* (2013.01); *G06F 16/735* (2019.01); *G06F 16/7834* (2019.01);
(Continued)

(58) Field of Classification Search
CPC .......... H04N 21/4884; H04N 21/4882; H04N 21/4828; H04N 21/47202; H04N 21/4394; H04N 21/42203; G10L 15/30; G10L 15/26; G10L 15/22; G10L 15/183; G10L 15/1822; G10L 15/1815; G06F 16/7867;
(Continued)

(56) References Cited

U.S. PATENT DOCUMENTS 4,570,232 A * 2/1986 Shikano .................. G10L 15/12
704/241
5,598,557 A * 1/1997 Doner ................. G06F 16/3346
707/999.005
(Continued)

*Primary Examiner* — Michael B. Pierorazio
(74) *Attorney, Agent, or Firm* — KW Law, LLP

(57) ABSTRACT

Methods, Systems, and Apparatuses are described to implement voice search in media content for requesting media content of a video clip of a scene contained in the media content streamed to the client device; for capturing the voice request for the media content of the video clip to display at the client device wherein the streamed media content is a selected video streamed from a video source; for applying a NLP solution to convert the voice request to text for matching to a set of one or more words contained in at least close caption text of the selected video; for associating matched words to close caption text with a start index and an end index of the video clip contained in the selected video; and for streaming the video clip to the client device based on the start index and the end index associated with matched closed caption text.

20 Claims, 6 Drawing Sheets

(51) Int. Cl.
   *G10L 15/22* (2006.01)
   *G10L 15/18* (2013.01)
   *G10L 15/30* (2013.01)
   *H04N 21/472* (2011.01)
   *H04N 21/488* (2011.01)
   *G06F 16/735* (2019.01)
   *G06F 16/783* (2019.01)
   *G06F 16/78* (2019.01)
   *H04N 21/439* (2011.01)

(52) U.S. Cl.
   CPC ........ *G06F 16/7867* (2019.01); *G10L 15/183* (2013.01); *G10L 15/1815* (2013.01); *G10L 15/1822* (2013.01); *G10L 15/22* (2013.01); *G10L 15/30* (2013.01); *H04N 21/4394* (2013.01); *H04N 21/47202* (2013.01); *H04N 21/4882* (2013.01); *G10L 2015/223* (2013.01)

(58) Field of Classification Search
   CPC .. G06F 16/7834; G06F 16/738; G06F 16/735; G06F 16/433
   See application file for complete search history.

(56) References Cited

U.S. PATENT DOCUMENTS

| | | | | |
|---|---|---|---|---|
| 6,085,160 A * | 7/2000 | D'hoore | | G10L 15/005 704/277 |
| 6,442,518 B1 * | 8/2002 | Van Thong | | G10L 15/26 704/235 |
| 6,473,778 B1 * | 10/2002 | Gibbon | | G06F 40/103 715/201 |
| 7,035,468 B2 * | 4/2006 | Yogeshwar | | G06F 16/51 707/E17.031 |
| 7,047,191 B2 * | 5/2006 | Lange | | G10L 15/26 704/235 |
| 7,065,524 B1 * | 6/2006 | Lee | | G06Q 40/08 706/45 |
| 7,092,888 B1 * | 8/2006 | McCarthy | | G10L 15/063 704/277 |
| 7,110,664 B2 * | 9/2006 | Yogeshwar | | G11B 27/10 386/328 |
| 7,509,385 B1 * | 3/2009 | Rittmeyer | | G06Q 10/107 715/224 |
| 7,729,917 B2 * | 6/2010 | Miyamoto | | G10L 15/22 704/275 |
| 7,739,253 B1 * | 6/2010 | Yanovsky | | G06F 16/9535 707/706 |
| 7,801,910 B2 * | 9/2010 | Houh | | G06F 16/78 707/765 |
| 7,873,654 B2 * | 1/2011 | Bernard | | G06F 16/3329 709/219 |
| 7,908,628 B2 * | 3/2011 | Swart | | H04N 7/17318 725/135 |
| 7,962,331 B2 * | 6/2011 | Miller | | G10L 15/01 704/235 |
| 8,121,432 B2 * | 2/2012 | Dorai | | G06F 16/7844 382/276 |
| 8,131,545 B1 * | 3/2012 | Moreno | | G10L 15/04 704/235 |
| 8,209,724 B2 * | 6/2012 | Rathod | | H04N 21/435 348/715 |
| 8,248,528 B2 * | 8/2012 | Hosking | | H04N 7/165 725/62 |
| 8,423,363 B2 * | 4/2013 | Gupta | | G10L 15/22 704/251 |
| 8,572,488 B2 * | 10/2013 | Phillips | | G06F 16/7834 715/716 |
| 10,573,302 B2 * | 2/2020 | Lee | | H04L 12/282 |
| 2002/0055950 A1 * | 5/2002 | Witteman | | G06F 16/40 707/E17.009 |
| 2002/0093591 A1 * | 7/2002 | Gong | | G06F 16/739 348/E7.063 |
| 2003/0025832 A1 * | 2/2003 | Swart | | H04N 21/6582 348/E7.071 |
| 2003/0061028 A1 * | 3/2003 | Dey | | G06F 16/40 704/9 |
| 2003/0169366 A1 * | 9/2003 | Lenzi | | H04N 7/10 348/461 |
| 2003/0206717 A1 * | 11/2003 | Yogeshwar | | H04N 5/76 386/328 |
| 2004/0096110 A1 * | 5/2004 | Yogeshwar | | G06F 16/51 707/E17.031 |
| 2005/0227614 A1 * | 10/2005 | Hosking | | H04N 7/165 455/3.06 |
| 2006/0015339 A1 * | 1/2006 | Charlesworth | | G10L 15/187 704/E15.02 |
| 2007/0124147 A1 * | 5/2007 | Gopinath | | G10L 15/19 704/E15.021 |
| 2007/0124788 A1 * | 5/2007 | Wittkoter | | H04N 7/17318 348/E7.071 |
| 2007/0214164 A1 * | 9/2007 | MacLennan | | G06F 16/90 |
| 2008/0066138 A1 * | 3/2008 | Bishop | | G06F 40/58 725/137 |
| 2008/0255844 A1 * | 10/2008 | Wu | | G10L 15/193 704/E15.022 |
| 2008/0262996 A1 * | 10/2008 | Yogeshwar | | G11B 27/10 707/E17.031 |
| 2008/0266449 A1 * | 10/2008 | Rathod | | H04N 21/44204 348/E7.001 |
| 2008/0270134 A1 * | 10/2008 | Miyamoto | | H04N 7/0885 348/E7.001 |
| 2009/0112592 A1 * | 4/2009 | Candelore | | H04N 21/4828 704/E15.001 |
| 2009/0171662 A1 * | 7/2009 | Huang | | G10L 15/1822 704/E15.041 |
| 2009/0210226 A1 * | 8/2009 | Ma | | G10L 15/26 704/236 |
| 2010/0091187 A1 * | 4/2010 | Topiwalla | | H04N 21/4355 348/E7.003 |
| 2010/0162294 A1 * | 6/2010 | Yin | | H04N 21/41407 725/30 |
| 2011/0022386 A1 * | 1/2011 | Gatzke | | G10L 15/06 704/235 |
| 2011/0040559 A1 * | 2/2011 | Kim | | G10L 13/08 704/271 |
| 2012/0016678 A1 * | 1/2012 | Gruber | | G06F 40/279 704/E21.001 |
| 2012/0101817 A1 * | 4/2012 | Mocenigo | | G10L 15/063 704/E15.001 |
| 2012/0253799 A1 * | 10/2012 | Bangalore | | G10L 15/183 704/E15.001 |

\* cited by examiner

CLOSE CAPTION DATABASE ARCHITECTURE — 410

| COMEDY | START PHRASE | START INDEX | END INDEX |
|---|---|---|---|
| $C_1$ | | | |
| $C_2$ | | | |
| $C_3$ | | | |

FIG. 4A

SUBTITLE DATABASE ARCHITECTURE — 420

| SCENE CATEGORY | PHRASE | START INDEX | END INDEX |
|---|---|---|---|
| COMEDY | | | |
| EMOTION | | | |
| MISCELLANEOUS | | | |

FIG. 4B

METHODS, SYSTEMS, AND APPARATUSES TO RESPOND TO VOICE REQUESTS TO PLAY DESIRED VIDEO CLIPS IN STREAMED MEDIA BASED ON MATCHED CLOSE CAPTION AND SUB-TITLE TEXT

CROSS-REFERENCE TO RELATED APPLICATIONS

This application is a continuation of the parent application U.S. patent application Ser. No. 16/791,347, filed on Feb. 14, 2020 entitled "METHODS, SYSTEMS, AND APPARATUSES TO RESPOND TO VOICE REQUESTS TO PLAY DESIRED VIDEO CLIPS IN STREAMED MEDIA BASED ON MATCHED CLOSE CAPTION AND SUB-TITLE TEXT", the contents of which is hereby incorporated by reference.

TECHNICAL FIELD

The present disclosure generally relates to receivers and home media systems, and more particularly to methods, systems and apparatuses to provide a content-focused television receiver that allows a user to first convert the speech to text and then execute an intelligent for content in cloud by leveraging caption or sub-title text available within streamed video content at the user's device.

BACKGROUND

There is available today, a plethora of television programming data and related content from an increasingly-large number of sources. In addition to the traditional cable, direct broadcast satellite (DBS) and terrestrial television broadcast sources of television programming, many viewers now obtain their television content from video on demand (VOD) services, remote storage digital video recorders (RSDVRs), local storage digital video recorders (LSDVRs), personal video recorders (PVRs), place shifting devices, web services and/or any number of other sources.

Although these alternate sources of programming and programming related content have given the consumer more choices and improved the viewing experience, the sheer number of programming and programming related content can be sometimes not only overwhelming to some viewers but can prove difficult to navigate, to discover and retrieve suitable content. That is, the conventional process of selecting different sources and channel surfing via a remote device connected to the set-top box can at the very least be challenging, time-consuming and frustrating to the user when trying to locate and access a particular program or video clip from one of the plethora of sources that may be available. This is because the conventional method of channel surfing requires the user to select a particular source and surf through an electronic program guide (EPG) to find the program or channel of interest, and the fast forward to the desired scene. Alternately, if available, the user can use a pre-configured thumbnail type menu, to select the desired scene in the media content for viewing. Both navigating steps are time-consuming and cumbersome that result in the user not performing the steps and subsequently missing the opportunity to see the desired video clip again in the streamed media content.

It is therefore desirable to create methods, systems and apparatuses that use voice to text cloud server services to receive voice requests and to identify and play particular video clips in streamed media to a client device based on a matching of text extracted from the voice request, and the closed caption and subtitle information available in the streamed media.

These and other desirable features and characteristics will become apparent from the subsequent detailed description and the appended claims, taken in conjunction with the accompanying drawings and this background section.

BRIEF SUMMARY

Methods, systems, and apparatuses are described to provide a content-focused television receiver that allows a user to use cloud-based voice searching for converting voice to text to respond to user voice requests to identify and play video clips in streamed video content based on matched close caption or sub-title text available within streamed video content at the users device.

In an exemplary embodiment, a method for implementing voice search in media content is provided. The method includes requesting, at a client device by a voice request, media content including at least a video clip of a scene contained in the media content wherein the media content is streamed to the client device; capturing, at the client device the voice request for the media content of the video clip to display at the client device wherein the streamed media content is a selected video streamed from a video source; applying a natural language processing solution for matching a set of one or more words contained in at least close caption text of the selected video; associating matched words to close caption text with a start index and an end index of the video clip contained in the selected video; streaming the video clip to the client device in accordance with the start index and the end index associated with matched closed caption text.

In various exemplary embodiments, the method further includes after converting a set of voice speech samples from the voice request to text, applying a natural language understanding (NLU) application for matching the set of one or more words contained in at least sub-title text contained in the selected video or sourced from a third party service; associating matched words to sub-title text with a start index of the video clip contained in the selected video; and streaming the video clip to the client device in accordance with the start index associated with matched sub-title text.

The method further includes matching the set of one or more words to a sub-genre field in a closed caption database table linked to at least a set of closed caption text including a phrase of text words in order to select a video clip based on close caption text matched to the phrase of text words wherein the set of one or more words are converted from the voice request. The method further includes matching the set of one or more words to a scene category field in a sub-title database table linked to at least one set of sub-title text including a phrase of text words in order to select a video clip based on the phrase of sub-title text words matched to the set of one or more text words wherein the set of one or more words are converted from the voice request. The voice request includes at least one set of a plurality of pulse-code modulation (PCM) audio packets transmitted from a client device via a set-top-box.

The natural language processing solution for converting captured voice requests to text is performed by a third-party service. The method further includes if the captured voice request is in a language different than the closed caption text, translating and converting the voice request into a same language text as the close caption text prior to performing a matching operation of words from the voice request to the closed caption text. The method further includes if the captured voice request is in a language different than the sub-title text, translating and converting the voice request into a same language text as the sub-title text prior to performing a matching operation of words from the voice request to the sub-title text. The method further includes sending the text of the captured voice requests to an interface for processing the text at a third-party smart television platform to identify by application of the third-party smart television platform a video clip for displaying at the client device.

In another exemplary embodiment, a system for processing voice requests for identifying media content in streamed media to display from voice requests, including a client device; and at least one server configured for voice to text search of media content in streamed media based on a voice request from a client device wherein the client device is communicatively coupled to the server over a network is provided. The server is configured to receive a voice request for media content including at least a video clip of a scene contained in the media content wherein the media content is streamed to the client device; capture the voice request for the media content of the video clip to display at a client device wherein the streamed media content is a selected video streamed from a video source; apply a natural language processing solution for matching the voice request to a set of one or more words contained in at least close caption text of the selected video; associate one or more matched words of the closed caption text with a start index and an end index of the video clip contained in the selected video; stream the video clip to the client device in accordance with the start index and the end index associated with matched closed caption text.

In various exemplary embodiments, the system includes the server configured to: after a conversion of a set of voice speech samples from the voice request to text, apply a natural language understanding (NLU) application to match the set of one or more words contained in at least sub-title text contained in the selected video or sourced from a third party service; associate matched words to sub-title text with a start index of the video clip contained in the selected video; and stream the video clip to the client device in accordance with the start index associated with matched sub-title text.

The system further includes the server configured to match the set of one or more words to a sub-genre field in a closed caption database table linked to at least set of closed caption text including a phrase of text words in order to select a video clip based on the closed caption text matched to the phrase of text words wherein the set of one or more words are converted from the voice request; match the set of one or more words to a scene category field in a sub-title database table linked to at least one set of sub-title text including a phrase of text words in order to select a video clip based on a set of sub-title text words matched to a phrase of text words wherein the set of one or more words are converted from the voice request.

The voice request includes at least one set of a plurality of pulse-code modulation (PCM) audio packets transmitted from a client device via a set-top-box. The natural language processing solution for converting a captured voice request to text is performed by a third-party service. The system further includes: the server configured to if the captured voice request is in a language different than the closed caption text, translate and convert the voice request into a same language text as the close caption prior to perform a match operation of words from the voice request to the closed caption text; and if the captured voice request is in a language different than sub-title text, translate and convert the voice request into a same language text as the sub-title text prior to perform a match operation of words from the voice request to the sub-title text.

The system further includes: the server configured to: send a text of the captured voice request to an interface to process the text at a third-party smart television platform to identify by application of the third-party smart television platform, a video clip to display at the client device responsive to the voice request.

In yet another exemplary embodiment, an apparatus to display a video clip contained in streaming media based on a voice search of the media content is provided. The apparatus utilizes at least one server in communication with a client to receive a voice request and to have access to a database to retrieve close caption and sub-title text of the streaming media to query for index information to display the video clip. The apparatus includes at least one server configured for voice to text search of media content in streaming media based on the voice request from a communicatively coupled client device, and the server configured to: receive a voice request for media content including at least a video clip of a scene contained in the media content wherein the media content is streamed to the client device; capture the voice request for the media content of the video clip to display at the client device wherein the streamed media content is a selected video streamed from a video source; apply a natural language processing solution for matching the voice request to a set of one or more words contained in at least close caption text of the selected video; associate one or more matched words of the closed caption text with a start index and an end index of the video clip contained in the selected video; stream the video clip to the client device in accordance with the start index and the end index associated with matched closed caption text.

In an exemplary embodiment, the apparatus includes the server configured to: the server configured to: after a conversion of a set of voice speech samples from the voice request to text, apply a natural language understanding (NLU) application to match the set of one or more words contained in at least sub-title text contained in the selected video or sourced from a third party service; associate matched words to sub-title text with a start index of the video clip contained in the selected video; and stream the video clip to the client device in accordance with the start index associated with matched sub-title text.

Additional embodiments could provide other systems, devices, remote devices, media players, software programs, encoders, processes, methods, and/or the like that perform these or other functions. Various embodiments, aspects, and features are described in detail below.

BRIEF DESCRIPTION OF THE DRAWING FIGURES

Exemplary embodiments will hereinafter be described in conjunction with the following drawing figures, wherein like numerals denote like elements, and FIG. 1 is a flowchart of an exemplary process to respond to voice requests to play particular video clips from streamed media content of the voice searching for video content application in accordance with an embodiment;

FIGS. 4A and 4B are an exemplary tabular architecture for a database of the closed caption and sub-title text linked to start/end indexes for playing particular video clips matched to voice requests of the voice searching for video content application in accordance with an embodiment;

Figure 5:
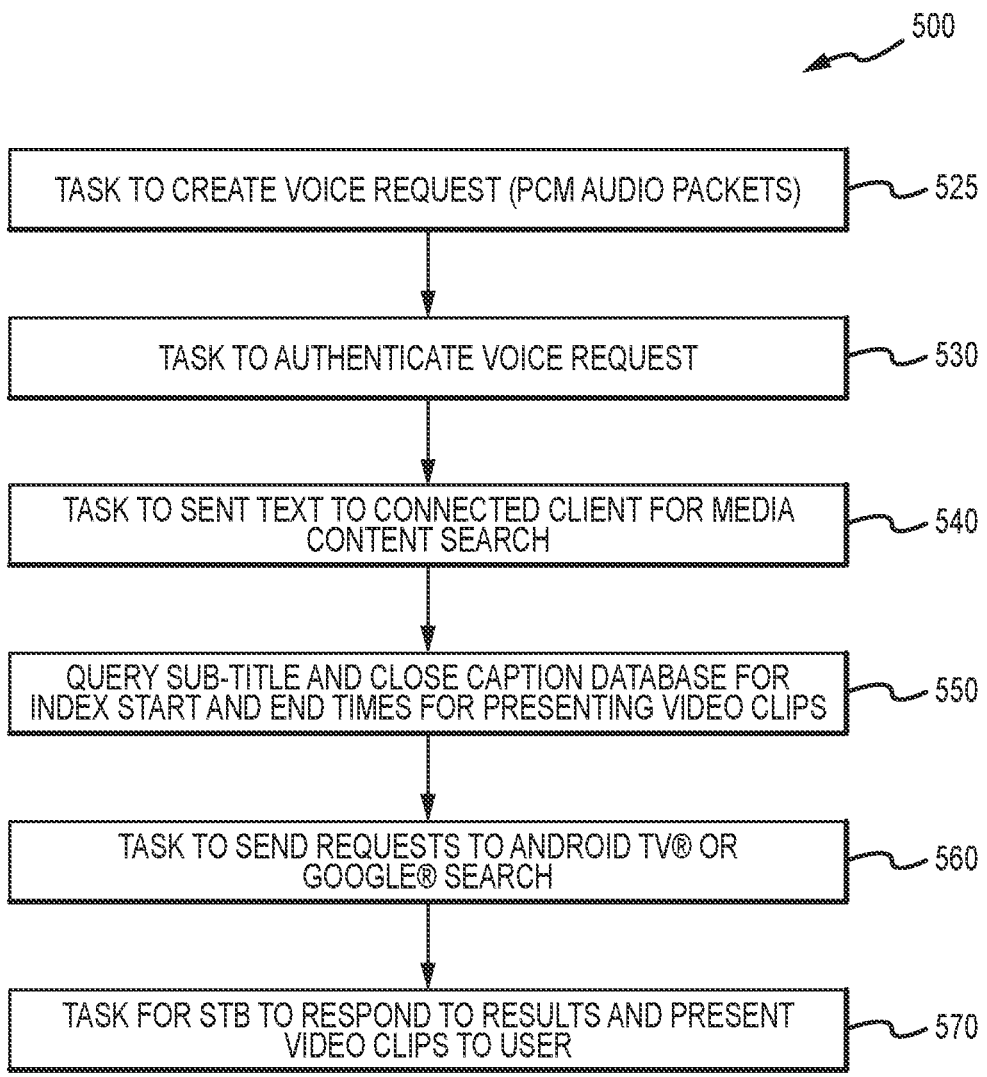
Figure 6:
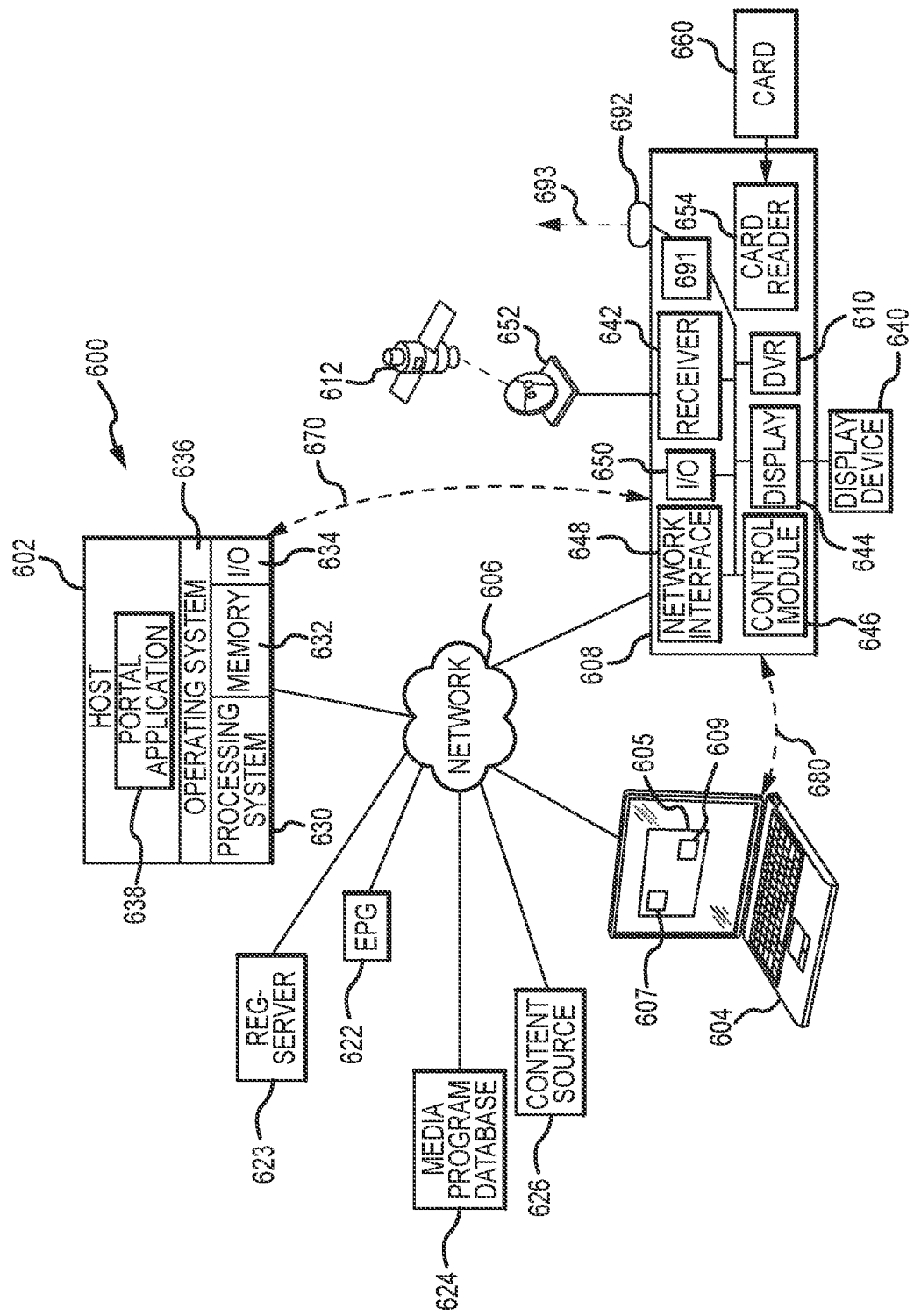

FIG. 5 is a flowchart of an example process for converting voice requests to text for playing particular video clips of streamed media content of the voice searching for video content application in accordance with an embodiment; and FIG. 6 is a block diagram illustrating an example place-shifting system in which the present embodiments for converting voice requests to text for playing particular video clips of streamed media content of the voice searching for video content application may be implemented.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a set-top box (STB) or other television receiver device provides an integrated content management service (ICMS) that focuses on particular television programs that are available, rather than the content or related data for channels, networks or other sources of programming. The viewer selects a program for viewing and then navigates the program for the desired scene. The STB obtains the selected program from whatever source may be available to the STB, including broadcast sources (e.g., cable, DBS, terrestrial broadcasts), stored content (e.g., content stored in a DVR), content available from video on demand (VOD) services, and/or any other sources of programming as appropriate. Various embodiments, therefore, allow the viewer to focus on the programming content itself rather than the source of the programming.

It is desirable, in various exemplary embodiments, to implement a cloud voice search that enables voice interaction by a user with a STB or receiver directly or via a remote device to query for and navigate content as well as to select channels, program and other content that is desirable to the user from a plethora of an of sources and not limited to the sources available to the STB.

It is desirable, in various exemplary embodiments, to implement with the voice cloud search, other voice to text services that include Natural Language Processing (NLP) services and Natural Language Understanding (NLU) service for enabling audio-to-text service that translates pulse PCM audio packages received from a STB (via a client or remote device connected to the STB) to text, and send the text to requester cloud server or the like and so forth to multiple next services.

It is desirable, in various exemplary embodiments to implement with the voice cloud search, a cloud service that accepts text and returns search results including scenes of media content from various search sources that are not directly available to the STB as well available sources to the STB.

It is desirable, in various exemplary embodiments, to modify and enhance in different ways to navigate, discover and identify content via a remote device with voice capabilities connected to the STB or other receiver devices, and many of these options are described herein.

Figure 1:
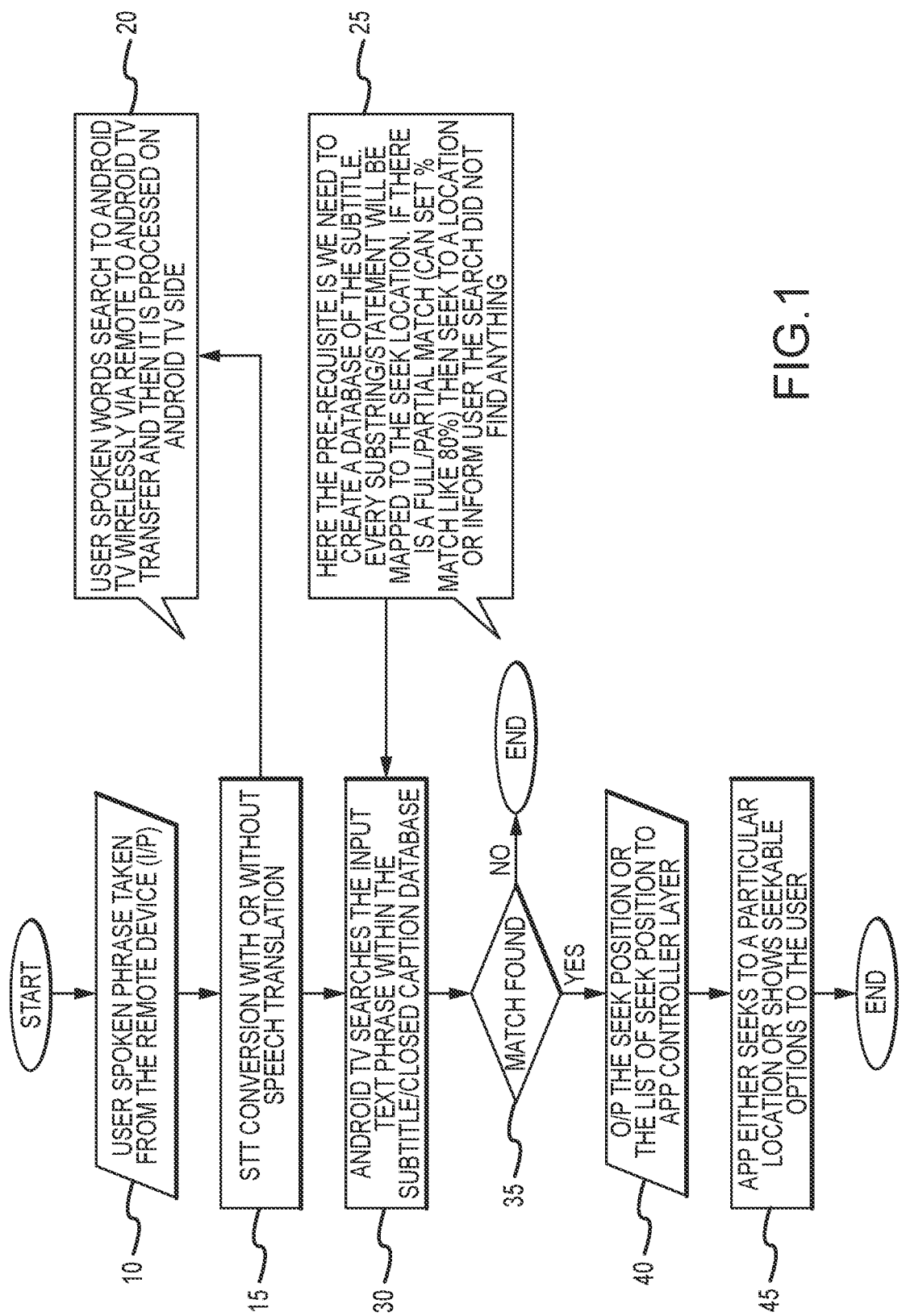

Turning now to the drawing figures with initial reference to FIG. 1, an example of the steps to implement the voice search of media content application 100 for content received by the set-top box or mobile devices using a third-party NLP service. At step 10, the user speaks a phrase that is received by a mobile device (i.e. smartphone, remote controller device etc.) with microphone capability to record or transfer the spoken phrase (i.e. voice request) for further analysis. At step 15, the speech to text (STT) with or without speech translation is performed. That is, in an exemplary embodiment, spoken speech may be received from the user in a language other than the language that is played or displayed in the media content that the user desires to navigate and/or discover or play a particular video clip. In this instance, the spoken speech recorded in the different language may be translated to the language of the media content for navigating and the particular video clip or scene. In other instances, the voiced speech may not be needed to be translated. That is, in the latter case, when a translation is not required, it would be if it is the case that the media content sub-title and/or closed caption text is available in the different languages and therefore the intermediate translation step is not required.

At step 20, in an exemplary embodiment, with implementing ANDROID® TV™, a remote server receives the spoken words for the NLP and for transferring to the ANDROID® TV server for processing by the ANDROID® TV™ server to identify the scene and for providing media content about the identified scene to stream to the user via a set-to-box or the like for viewing. At step 25, in an exemplary embodiment, a database of sub-titles or closed caption may be created in advance, may be downloaded locally to the viewing or streaming device for local search of the sub-title or closed caption database for identifying, and navigating to the scene or scenes of interest in the media content displayed and for playing the particular video clip. Further in step 25, every sub-string and statement will be mapped to the seek location. If there is a full or partial match (set for example, to a threshold percentage), then the search process can be enabled to seek or locate or inform the user that a near match was found, or no match was found dependent on the percentage results from the match. At step 30, the ANDROID® TV or other similar third-party services search text received from the user's spoken words and searches a database or other repository of phrases, commands, meta-data etc. For example, the database of the repository may contain subtitles and closed caption text content for the desired media content.

At step 35, a determination is made by the voice search media content application using various solutions whether a match or association with the spoken words received of the user and the close caption or sub-title text are found. If there is no related or matched close caption or sub-title text then the process has ended. Alternately, at step 40, if there is a match found, then the seeking, fast forward or a list of positions in seeking positions are displayed to enable the view to control the voice search media content application to display the content of interest. For example, at step 45, the voice search media content application can either seek a particular location or display one or more searchable (i.e. seek able) options for the user selection to navigate to the content of interest and to display the content of interest.

Figure 2:
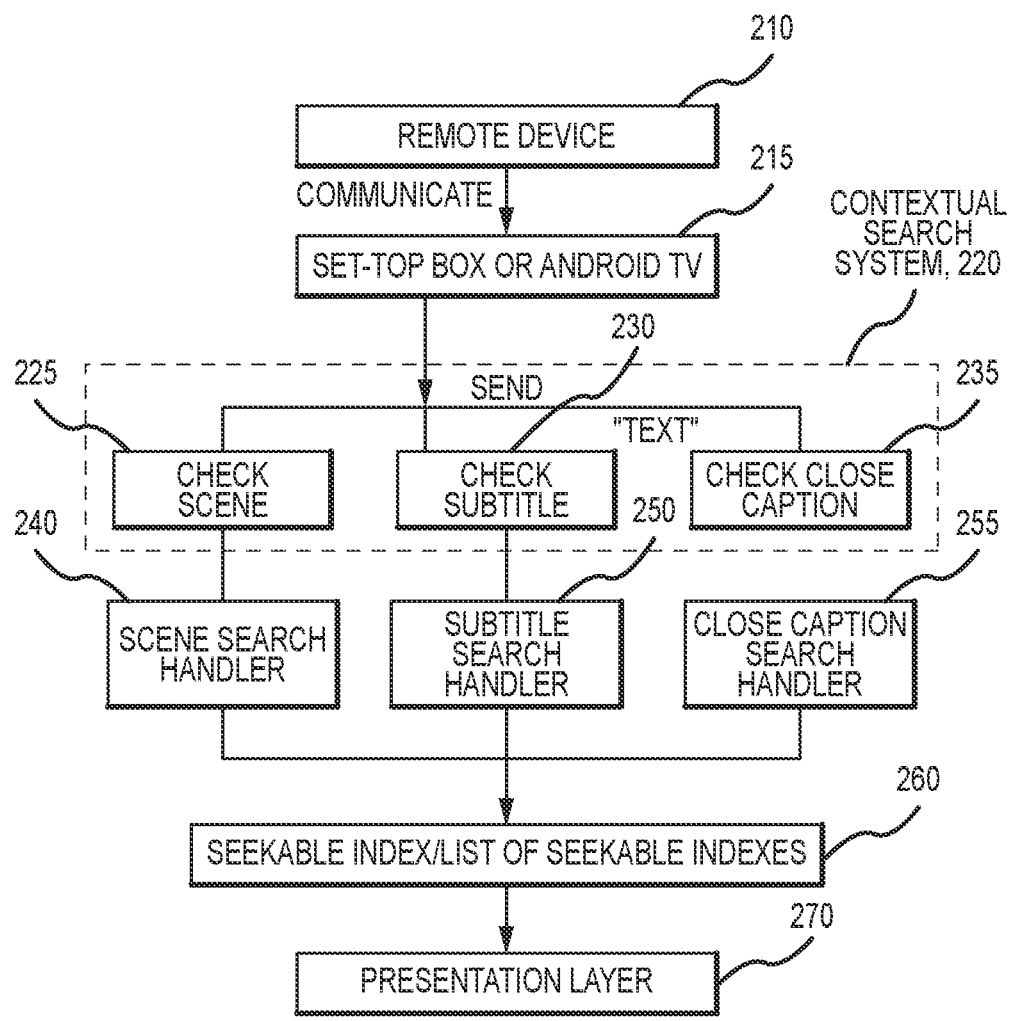
FIG. 2 is a block diagram of an exemplary process to respond to voice requests based on a matching process using closed caption and sub-title text of the streamed media content to play particular video clips of the voice searching for video content application in accordance with an embodiment.

FIG. 2 is a block diagram of an exemplary process to respond to voice requests based on a matching process using closed caption and sub-title text of the streamed media content to play particular video clips of the voice searching for video content application in accordance with an embodiment; In FIG. 2, initially via a remote control one or more voice requests are communicated to a set-top box of ANDROID® TV™. In an exemplary embodiment, the DISH® 54.1 Voice Command Remote Control for DISH® HOPPER® with GOOGLE® ASSISTANT™ enables Internet connectivity required for voice search functionality. The DISH® 54-series or 50.0 remotes can be enabled by the user pressing and holding a microphone button located on the remote to give an applicable command and then executing the GOOGLE® search request by releasing the microphone button. In this case, PCM audio requests are communicated to the set-top box or ANDROID® TV™ at block 215 for further processing. At block 220, once the text from the voice or audio request has been converted from speech to text and received, the control search system 220 performs a set of search actions that are at block 225, to check for a scene in the media content that can be associated with the text, at block 230 to check for a sub-title text that match one or more words in the text of the voice request received, and to check for closed caption text 235 contained in the media content being displayed. The set of actions in block 220 can also be applicable for matching to any media available locally, or even available remotely such as media content from subscribed services that contain available close caption or sub-title to identify a scene or a set of scenes associated with the text. In the latter case, third party media content services such as ANDROID® TV or GOOGLE® search may be employed to find and identify scenes and/or sets of scenes that match the initial voice request for a scene to view. In both the case of ANDROID® TV™ and GOOGLE® search, the search is performed independently and media content is identified for display based on the text in the original voice request. Further, the third-party services (i.e. ANDROID® TV™), may also identify the length and type of scene that is desired and communicate feedback for confirmation if necessary, and/or identify related media content for streaming to the user.

At block 240, a scene search handler is executed to identify the desired scene based on the contextual search results at block 225. As block 250, a sub-title search handler is created to identify a content media portion with a sub-title, and likewise, a close caption search handler 225 bases on the check of the close caption at block 235 is created to identify the related media content for display. Once the various scenes, media portions, video clips etc. are tagged with the appropriate handler, then at block 260 a searchable index for media content of interest may be created or a list of searchable indexes associated with the media content of interest. At block 270, the presentation layer is formed for listing the scenes, video clips or other desired media content in a manner that allows the user to pick various scenes or video clips for viewing. For example, the presentation layer could be presented as an array of thumbnail JPEG images of related scenes, of a listing with executable scripts upon user selection of various scenes or video clips for viewing.

Figure 3:
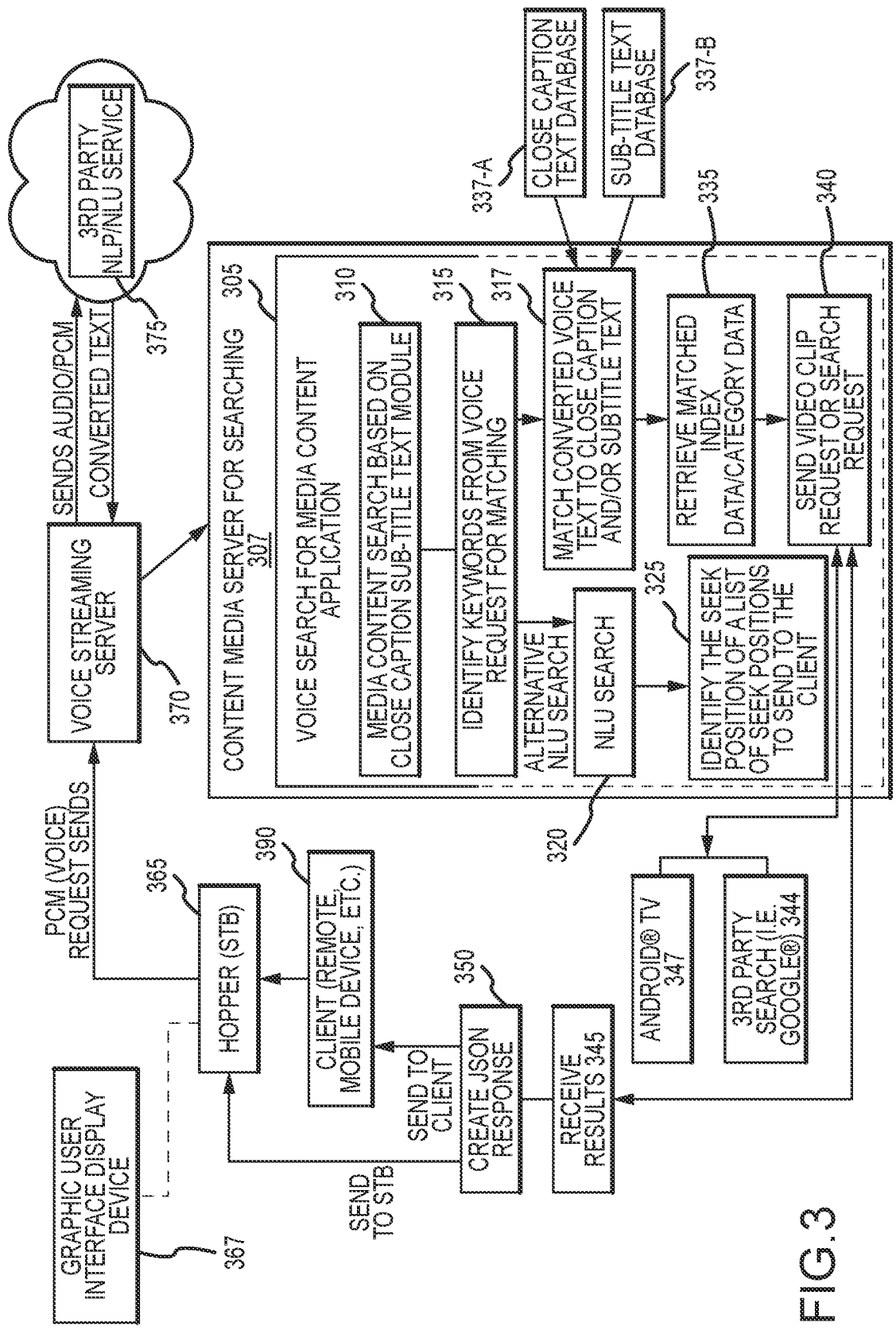
FIG. 3 is a block diagram of an example voice searching for video content system for converting voice requests to text for playing particular video clips of streamed media content of the voice searching for video content application in accordance with an embodiment.

FIG. 3 is a block diagram of an example voice searching for video content system for converting voice requests to text for playing particular video clips of streamed media content of the voice searching for video content application in accordance with an embodiment. In FIG. 3, there is shown an example of a voice search service 300 for STB box clients. The voice search service contains two sub-services, the first service is an audio-to-text service that translates PCM audio package to text and then sends the text to the requester, and so forth (i.e., propagating to the next connected service(s)). The second service is a search service that accepts text and returns the search results.

In addition, the second service is configured with a search criteria service that can apply a determined or a structured search criterion to search to a resultant search service (i.e. GOOGLE® Search) or television search service (i.e. ANDROID® TV™). Hence, the by separating text from the PCM audio package, the audio-to-text process extracts from the PCM audio package text for use by the search service or television search service which can be given other search criteria to guide, limit, or enhance query operations of the search service to enable the best or most relevant results by real-time voice communication of the user, of relevant media content to be presented to the user.

The voice cloud search service operates as a voice search service 300 that receives and sends PCM audio package requests from the STB 365 to a PCM server 370 and in response to the PCM audio package requests; the STB 365 after the requests are processed by PCM server 370 to receive keywords for display. The PCM audio stream is sent to a PCM server 370 which in turn sends the PCM stream to a third-party NLP process server 375 for parsing and semantic recognition of the streamed PCM audio packets. The NLP process server 375 returns the recognized text from the NLP processing of the audio packets and sends the accepted or recognized PCM audio packages as a text set for further search processing the cloud.

In cases, where the results can be considered expected, for example connecting to another source, changing to a particular, the results are returned to the user or viewer as the expected result. The recipient service (i.e., the third-party automated speech recognition service) is hosted on a separate server and could be any one of a plethora of such NLP solutions available on the market. For example, NUANCE® ASR or GOOGLE® ASR Services can be implemented to translate the PCM audio packages to texts. If the ASR service fails, then an error code can be generated, and a corresponding error text would be sent to the voice display device 367 of the result. If a valid text (i.e., a recognized text) is returned from third-party NLP Service (i.e., at the NLP process server 375), the PCM server 370 (i.e. the recipient service) will issue or sent a text search request to voice cloud text search service 305 and return the voice display result with a text set to the user at a client device on a display device 367.

After the NLP process server 375 completes the voice recognition step and converts the voice (i.e., the PCM audio package) to text, a GNAT server 380 provides an additional level of security by an authentication framework of GNAT secure hash to authenticate the data packets streamed from the PCM server 370. GNAT is a free software compiler for the Ada (ex. Structured language) programming language which forms part of the GNU Compiler Collection (GCC) authorization service. As an example, the voice verifies the authentication service implemented is a GNAT authorization service that validates a token posted by the client at the STB. The GNAT authorization returns an HTTP if authorization fails or in another situation that treats the authorization as a failure or treats the HTTP as validation or success.

The responsibility of GNAT authorization service (or other authorization services) is designed to cooperate with ASR service(s) by the NLP process server 375 that performs the NLP processing. The ASR service is triggered by JavaScript executed to extract text from the PCM audio package and to determine what the next step should be, return a result. The text extracted for sending as the voice display result is returned to the client (of the STB 365) only after the post search request has been performed by the voice search media content application 305 triggered by a search text request script before returning any results.

The text or text set from the PCM server 370 is sent to the voice search media content server 307 which hosts a voice search media content application 305 (i.e., a virtual content search application). A voice search of media content 310 is performed based on close caption text and/or sub-title text by identifying keywords at 315 to perform the search of media content. Then, matching 317 the identified keywords with data in a closed caption database 337-A and/or a sub-title database 337-B. At 335, the voice search media content application receives data of sub-titles and/or close caption and corresponding start and end index for playing the media content. If no results are received then a search request 340 is sent to ANDROID® TV™ 347 based on the subtitle or closed caption data and media content results 345 are received. Alternately, a search request can be sent to a third-party search service 344 (i.e. GOOGLE® web-search, YOUTUBE®) to get related video snippets based on the third party search algorithms. Once, received, a JSON response can be sent to the client 390 to display in the GUI interface display 367 the media content. In an alternate exemplary search, an NLU search at 320 can be performed on the identified keyboards and the search request based on NLU results for a contextual text search service 325 can be sent third party content sources for finding relevant contextual content to send to the client.

The contextual and content search includes: At step 315, a controller responsive to a voice text request for the media content search accepts a particular search text request for searching by the cloud media content search asynchronizely. The cloud contextual text search service 325 can be configured to execute a translation service to translate or convert text to target text (i.e., a command) by a cloud search text translation mapping. In an exemplary embodiment, a text such as "find the steam engine in the Orient Express Movie" can be mapped to a command such as "match steam engine" in the close caption or sub-title data (or meta-data) of the "Orient Express video (MPEG) file". Also, the cloud text service can perform an NLU, which is called by an NLU search text request for the NLU Service 320. In parallel or at about the same time, a text database search service can also be called. The close caption and sub-title database search and the NLU search can be performed in parallel.

The NLU Service 320 can be configured as a service that directly translates a text to an active (i.e. action) operation and can be made part of the voice display results sent back to the STB 365. The close caption a sub-title database search 310 can be configured to search a plurality of sources and also return any results as part of the voice display results. At step 335, the text of closed caption and/or subtitle data is returned from the databases 337-A and 337-B by an entity-intent object. At step 340, the data is used to create the JSON response at step 350 to the STB. After step 350, the voice display result is sent to the client 390 (i.e. mobile device). That is the constructed and return JSON response of the voice display result is sent to the client to deliver the video content to STB.

FIGS. 4A and 4B are an exemplary tabular architecture for a database of the closed caption and sub-title text linked to start/end indexes for playing particular video clips matched to voice requests of the voice searching for video content application in accordance with an embodiment. In FIG. 4A, in table 410, a data structure with fields designated as genre type, start a phrase, start index and end index are shown. When a voice request is made and matched to a genre type (i.e. in this case "comedy") and/or to a phrase spoken in the media content, then data of the start and end of the related video scene is sent or the media content is configured by indexing in a manner to be presented to the user to select the media content for viewing at a client device. In FIG. 4B, in table 420, a similar data structure is shown except instead of a "genre type", a "scene-category" field is used for matching to a scene category a voice request and to send start and end index of video content that matches to the phrase in the scene category or simply match to the phrase. In either of the tables shown, in FIGS. 4A and 4B, tabular indexing of scenes, genre types are linked to indexes of start and end times in media content for matching voice requests to show content with scenes in the media content.

FIG. 5 is a flowchart of an example process 500 executable by a voice search media content server system for converting voice to text and search and performing a (elastic) search for a relevant media content as well as channel, program and content data in response to voice requests from the user remote client in accordance with various embodiments.

At task 510, a PCM audio package (i.e. voice request for media content from the user) is generated by the STB and sent to a search server, which is in communication with the STB. At task 525, the search server processes the PCM audio package captured at the remote client, at a third party voice search server (i.e. speech to text translation service) to send as a text of the voice request for media content to a voice search for media content by the configured server. The PCM audio at the voice cloud search server sends the PCM audio for processing by a third-party natural language processing service that extracts the PCM audio and returns text to the voice search for media content by the configured server. At task 530, the PCM audio package is authenticated for the particular client or requestor from which it was sent (i.e., the STB, etc.). At task 540, the text is then sent to a connected client for voice search for the media content (cloud) by the configured server. The voice search of media content by the configured server is coupled to other third party database sources including a repository for closed caption texts associated with a video media content, and a repository of sub-title text associated with a video media content.

At task 550, the querying of the sub-title and the close caption databases is performed and indexes of start and end time for media content of scenes related to the voice requests from the user are received. For example, the querying may take the form of identified keywords from the voice requests and the keywords matched to genres and/or categories in fields of a tabular architecture of the databases containing close caption and sub-title text in order to match to text to identify the relevant scenes for viewing. Alternately, if no matches are found, then at task 560, requests based on the keywords identified can be sent to third party services such as ANDROID® TV™ or GOOGLE® search for video content. In this case, ANDROID® TV™ would independently perform a search and respond to the request from the voice search media content application.

In the case of a third-party search provider, the vice request could be sent based on the captured phrase, the identified text, the category, the genre etc. in other words in a variety of ways. Further, a digest could be formed for the search request for processing and identifying relevant video content. In an exemplary embodiment, the third-party search service can be MICROSOFT® BING®, GOOGLE®, WIKI.COM®, TWITTER®, YANDEX®, BAIDU® etc. . . . . That is the voice search media content server can be configured with appropriate APIs to access one or more different third-party search services to request and retrieve content related to the requests for the voice search media content server.

In addition, if no relevant program or channel data is returned, the text is sent to a search services client searches for addition searching of NLU, VOD, and other databases. The relevant content discovered from the search services client is a return to the voice search media content server.

In addition, when there is no relevant program or channel data is returned, the text is sent to can be sent to a search services client for additional searching. In various exemplary embodiments, prior to sending the text, similar or related text or phrases may also be sent or the text itself can be augmented prior to sending to the third party media content search server by artificial intelligence or machine learning applications.

The voice search media content service may send a request to a third-party search service to get relevant content results. For example, the communication may involve a series of back and forth communications confirming receipts of results or sending more results in response to the original requests by the third-party search service. In other words, the third-party search service will independently assess the requests and provide feedback as to the results and/or related results in response. The response from the third-party search service may instance be listings of hypertext links on an HTML page, HTML pages, image files, MPEG files, raw image and video, combinations of image and video, social network pages and posts, etc. . . . . In other words, the search provider may be able to serve up any relevant results that the search provider deems appropriate within the context of the agreement made between the search service and the search cloud ecosystem, STB providers, or operators.

At task 570, the STB with the integrated controller is configured to be responsive to voice controls from the voice module in the STB and to present the results in a GUI at the STB that has voice responsive functionality for showing the results and for navigating sets of results. The voice module may also send PCM audio packets to the voice cloud search service from the user in response to viewing the results in the GUI for getting more results or for changing the results. This enables a feedback process for the user to continuously or dynamically change the results displayed to the user at the STB.

The above systems and methods may be implemented in the context of a wide variety of entertainment devices and systems. FIG. 6 depicts one, non-limiting, example: a system 600 for placeshifting or otherwise transferring data or content, such as a media program (or media content), from a source electronic device 608 to a destination electronic device 604 over a network 606 for presentation to a user (or viewer) on the destination electronic device 604. Thus, server 307 of FIG. 3 may be implemented as content source 626, network 300 of FIG. 3 may correspond to network 606 of FIG. 6, and computing device (i.e. the client) 390 of FIG. 1 may correspond to device 608 (or device 604). For purposes of explanation, but without limitation, the source device 608 may be alternatively referred to herein as a media device or a placeshifting device, and the destination electronic device 604 may be alternatively referred to herein as a playback device or a client device (or client).

The placeshifting system 600 also includes a host server 602 (or host) that communicates or otherwise interacts with the devices 604, 608 over the network 606 to facilitate the establishment of a peer-to-peer connection 680 over the network 606, which may be utilized for a placeshifting session, as described in greater detail below. It should be understood that FIG. 6 is a simplified representation of the placeshifting system 600 for purposes of explanation is not intended to limit the subject matter described herein in any way.

In practice, the client device 604 may be any device, component, module, hardware and/or the like that is capable of communicating with the server 602 over network 606. For example, depending on the embodiment, client device 604 may be realized as a conventional personal computer, portable computer, a tablet computer, workstation and/or other computing system, a mobile (or cellular) telephone, a smartphone, a personal digital assistant, a video game player, and/or any other device capable of receiving media programs via the network 606 and presenting audio and/or visual content. In this regard, the client device 604 includes a display device, such as a monitor, screen, or another conventional electronic display, capable of graphically presenting visual content, data and/or information that is generated or otherwise provided by an application 605, 607 executing on the client 604. The client device 604 may further include a user input device, such as a keyboard, a mouse, a touchscreen, or the like, capable of receiving input data and/or other information from the user of the client device 604. The client device 604 also includes a processing system and a data storage element (or memory) that is coupled to or otherwise accessed by the processing system and stores programming instructions that, when read and executed, cause the processing system of the client device 604 to generate one or more applications 605, 607, 609 executing thereon and perform various tasks, functions, processes and/or operations and support the subject matter described herein. The processing system may be realized as any sort of processor, microprocessor, microcontroller, digital signal processor, or any other suitable processing device, or any suitable combination thereof.

The client 604 may reside at a geographic location that is remote or otherwise physically distinct from the geographic location of the media device 608. In this regard, the media device 608 may have an essentially fixed or permanent geographic location, whereas the geographic location of the client 604 may be transient or otherwise variable with respect to the location of the media device 608. For example, the media device 608 may be realized as a set-top box or a similar device that resides at a user's home for providing media content to the user's television or other home display device 640, while the client 604 is realized as a portable electronic device, such as a mobile phone or other mobile computing devices, that moves about with the user.

In the embodiment shown in FIG. 6, client device 604 executes a conventional browser or other client application 605 that is compatible with the standard Internet, world wide web (WWW), transmission control protocol, and/or Internet Protocol (TCP/IP), and/or other formats. Such browsers are typically capable of displaying active or other documents formatted in accordance with published protocols and/or computer languages (e.g., hypertext markup language (HTML), extensible markup language (XML), cascading style sheets (CSS), JavaScript, and/or the like). Many browsers are also capable of executing "plugin" applications, applets or the like. Such plugins may be formatted in accordance with ActiveX, JAVA, JavaScript and/or any number of other formats. A number of commonly used web browsers are available for a number of different computing platforms, and the subject matter described herein is not limited to any particular browser application. In the illustrated embodiment, client 604 further includes a media player application 607. The media player 607 may be a standalone media player, or the media player 607 may be implemented as a plugin or other applet that runs within the client application 605 as desired. In some embodiments, media player 607 is initially obtained from a networked host, such as server 602. The media player 607 may be retrieved on an as-needed basis in some embodiments or may be stored at client 604 for subsequent execution.

With continued reference to FIG. 6, in exemplary embodiments, media device 608 is any form of device, module, component, hardware and/or the like capable of receiving and processing media content from one or more content sources. For example, in some embodiments, media device 608 is a set-top box (STB) or similar system that is able to receive television programming and/or to record certain programs that can be viewed on a display device 640, such as a television, monitor, liquid crystal display (LCD), light-emitting diode (LED) display, plasma display, or the like. Exemplary embodiments of media device 608 will, therefore, include or otherwise be coupled to a receiver interface 642 for receiving satellite, cable and/or broadcast programming signals from broadcast sources 612, as well as a data storage medium 610 (e.g., a hard disk, flash memory, or another suitable non-volatile data storage element) to support a digital video recorder (DVR) feature and/or functionality, a display interface 644 for providing imagery to the display device 640, and a control module 646 that directs the operations of the media device 608 as appropriate. For convenience, but without limitation, the data storage medium 610 is alternatively referred to herein as a DVR. Media device 608 may also include one or more interfaces 648 to the network 606 and/or an input/output interface 650 to remote control or other devices for providing user inputs to the media device 608, as appropriate. For example, the network interface(s) 648 of the media device 608 may include an interface or port for a wired communications layer (e.g., an Ethernet port or adapter), an interface for a wireless communications layer (e.g., an IEEE 802.11-compatible transceiver), and/or the like.

The components in media device 608 may be provided within a common chassis or housing as depicted in FIG. 6, although equivalent embodiments may implement media device 608 with any number of inter-connected but discrete components or systems. For example, in some embodiments, the media device 608 may be realized as a combination of an STB and a placeshifting device, wherein some features of the media device 608 (e.g., the DVR 610, the receiver 642, the display interface 644, and/or I/Os 650) are implemented by the STB and other features of the media device 608 (e.g., the network interface 648) are implemented by the placeshifting device, wherein the placeshifting device works in conjunction with the STB to shift the viewing experience from a home television (e.g., display device 640) to a viewing display on the client device 604 that is accessed via the network 606. Examples of placeshifting devices that may be used in some embodiments of the media device 608 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 608 may be a hybrid DVR and/or receiver, for example, that also provides transcoding and placeshifting features. It should be appreciated that FIG. 6 depicts merely one exemplary embodiment of a media device 608, and in practice, the media device 608 may be logically and physically implemented in any manner to suit the needs of a particular embodiment.

In the exemplary embodiment illustrated in FIG. 6, the media device 608 is capable of receiving digital broadcast satellite (DBS) signals transmitted from a broadcast source 612, such as a satellite, using an antenna 652 that provides received signals to the receiver 642. Equivalent embodiments, however, could receive programming at receiver 642 from any sort of cable connection, broadcast source, removable media, network service, the external device and/or the like. In some embodiments, the media device 608 may also include an access card interface or card reader 654 adapted to receive an access card 660 (or viewing card) configured to ensure that the viewer is authorized to view media content provided to the primary display device 640. In this regard, the access card 660 includes unique identification information associated with a particular subscriber to the broadcast content source 612 or otherwise includes subscription information that facilitates receiving and/or decoding media content provided by the broadcast content source 612.

The DVR 610 feature stores recorded programming (e.g., recorded broadcast programming received via receiver 642) on a hard disk drive, memory, a networked server, or other storage media as appropriate in response to user/viewer programming instructions, wherein the recorded programming may be subsequently viewed via the media device 608, either on display device 640 or client device 604 via network 606. Content stored in DVR 610 may be any sort of file-based programming or other content that is accessible to media device 608. In various embodiments, in addition to storing broadcast programming, the DVR 610 may also store programming received from other sources not illustrated in FIG. 6, such as, for example, programming downloaded from an on-demand programming source or an online programming source. Additionally, content in DVR 610 may be stored in any sort of compressed or uncompressed format, as desired, and may be encoded or transcoded as desired for effective receipt, storage, retrieval and playing.

The control module 646 is any sort of hardware, circuitry, processing logic and/or other components capable of directing the operations of the media device 608. In various embodiments, the control module 646 includes software or firmware logic and/or other programming instructions residing in memory and executing on any sort of processing systems, such as any sort of processor, microprocessor, microcontroller, digital signal processor or the like. The instructions, when read and executed, cause the control module 646 to perform various tasks, functions, processes and/or operations and otherwise support the subject matter described herein. In various embodiments, the control module 646 is based upon a "system on a chip" (SoC) implementation that incorporates a hybrid microcontroller with memory, input/output and other features to perform the various signal processing and other actions of the media device 608. Other embodiments may implement control module 646 and/or the other features of the media device 608 with any number of discrete and/or integrated processing components (e.g., any sort of microprocessor or microcontroller), memories, input/output features and/or other features as desired. The control module 646 communicates with the network interface 648 to establish a peer-to-peer connection 680 to the client device 604 over the network 606 and support streaming of media programs (e.g., from the DVR 610 or the receiver 642) to the client device 604 over the network 606 via the peer-to-peer connection 680, as described in greater detail below.

In the embodiment of FIG. 6, the network 606 is any communications network (or a combination of communications networks) capable of transmitting data between devices within the system 600. In various embodiments, network 606 includes any number of public or private data connections, links or networks supporting any number of communications protocols. Network 606 may include the Internet, for example, or any other network. Such networks may be based upon TCP/IP or other conventional protocols, although other embodiments may use any type of alternative or successor protocols, as desired. In various embodiments, network 606 may also incorporate a wireless and/or wired telephone network, such as a cellular communications network for communicating with mobile phones, personal digital assistants, and/or the like. Various embodiments of network 606 may also incorporate any sort of wireless or wired local area networks (LANs), wide area networks (WAN), or the like.

In the illustrated embodiment of FIG. 6, the server 602 may be realized as one or more server computers or other devices (s) coupled to the network 606 and capable of interacting with the devices 604, 608 to facilitate communications between the client device 604 and the media device 608 associated with the user or operator of the client 604. The server 602 may be implemented with a server computer system or data processing system that is based upon any processor, architecture and/or operating system, and will typically be implemented using a processing system 660, memory 632, and input/output features 634. Various embodiments may be implemented using dedicated or shared hardware servers; other implementations may make use of virtual server features as part of a "cloud computing" service, such as any of the cloud computing services provided by any number of providers.

While FIG. 6 illustrates a single server 602, many practical embodiments of the system 600 may provide a cluster or other collection of multiple host servers 602 to support any desired number of simultaneous communications with multiple clients 604 and/or multiple media devices 608. This cluster may also incorporate appropriate routing, load balancing, access and security mechanisms and or any number of other features. In various embodiments, each server 602 is an actual or virtual computer system executing an operating system 636 in conjunction with the processing system 630, memory 632 and/or I/O features 634 to provide a computing core that is capable of executing a portal application 638, as well as any number of daemons, processes, applications or other modules as desired. For example, a portal application 638 could execute as a daemon on the server 602, with connections to separate clients 604 being managed as separate processes or instances that communicate with portal application 638 using features provided by operating system 636. In one or more embodiments, the memory 632 stores programming instructions that, when read and executed, cause the processing system 630 to create, generate, or otherwise facilitate the portal application 638 and perform various tasks, functions, processes and/or operations described herein. In this regard, the memory 632 represents any non-transitory short or long term data storage element or other computer-readable media capable of storing programming instructions for execution by or on the processing system 630.

The user of the client 604 is able to connect to the portal application 638 supported by host 602 via the network 606, for example, by directing the client application 605 to a URL or other network address associated with host 602 and/or portal application 638. In exemplary embodiments, after the user is successfully authenticated by the portal application 638, and he gets the connection parameter associated with device 608. Using the connection info client 605 establishes a channel 680 which is used to stream media data and to and from communication. Thereafter, the client 604 utilizes the connection 680 to obtain, from the media device 608 via the network 606, information about programming stored at the media device 608 and available for placeshifting to the client device 604, such as, for example, a listing of the media programs stored on DVR 610. It should be noted that although FIG. 6 depicts the network connection 680 as being between the host 604 and the media device 608, in practice, the placeshifting system 600 may include one or more intermediary components (e.g., one or more message servers or relay server) configured to establish, facilitate, or otherwise support the connection 680.

Server 602 is coupled to an electronic program guide 622, which may be realized as a server, a database, or another device operating on the network 606 that maintains information pertaining to current and/or future broadcasts (or airings) of media programs that are available to be received from broadcast source 612 (e.g., by the media device 608 via receiver 642 and/or antenna 652). The server 602 and/or the portal application 668 may obtain information pertaining to current and/or future broadcasts (or airings) of media programs from the electronic program guide 622 and generate or otherwise provide a program guide graphical user interface (GUI) display on the client device 604 (e.g., within client application 605) that indicates media programs that are or will be available for streaming from the media device 608. The user of the client device 604 may manipulate or otherwise utilize the graphical user interface (or the graphical user interface elements contained therein) to select or otherwise identify media programs for streaming to the client device 604 and/or recording to the DVR 610. The user may pause or otherwise stop the presentation of the streamed media program and manipulate or otherwise operate the client application 605 to transmit or otherwise provide, via the network 606, a request for content to a third-party content source 626 (e.g., a third-party website). The third-party content source 626 responds to the request by transmitting or otherwise providing content to the client device 604 via the network 606.

In the illustrated embodiment of FIG. 6, the placeshifting system 600 also includes a media program database 624 that includes verified or validated metadata and/or other descriptive information for a vast array of media programs. For example, the media program database 624 may contain metadata and/or other descriptive information pertaining to substantially all of the media programs that may be available from one or more content sources within placeshifting system 600 (e.g., information pertaining to any media programs that have previously been aired by a broadcast source 612, along information pertaining to any movie that has been presented in theaters, made available on-demand, or released for individual use (e.g., on digital video disc (DVD) or the like)). In exemplary embodiments, for each media program having a record (or entry) in the media program database 624, the media program database 624 maintains a media data object that includes one or more fields of metadata associated with that media program along with one or more fields of program identifiers that may be used to identify that media program record. In this regard, the program guide 622 and the media program database 624 may utilize the same program identifiers to uniquely identify each media program.

Placeshifting system 600 may also include a registration server 623, as illustrated. After authentication and connection parameters are provided by server 602, either server 602 or 605 can fetch the appropriate registration information. The media device may register itself with the registration server 623 over network 606. As part of registration, the media device communicates its own unique ID and a port that the device "listens" to. The registration server 623 knows the device ID, its public IP address, and the port number with which it listens. This process may be periodic so that any change in the public IP address or port would be reflected in the registration server 623.

The foregoing discussion, therefore, presents systems, devices, and processes to create a "content-centric" experience that focuses on the program, channel, and related data content instead of the source of the content. Rather than forcing viewers to separately consider content from each unique source that may be available, various embodiments allow viewers to perform a voice search of a combined program directory with search result content and to retrieve not only programs but related content based upon the subject matter of the program itself providing richer user experience.

The term "exemplary" is used herein to represent one example, instance or illustration that may have any number of alternates. Any implementation described herein as "exemplary" is not necessarily to be construed as preferred or advantageous over other implementations.

While several exemplary embodiments have been presented in the foregoing detailed description, it should be appreciated that a vast number of alternate but equivalent variations exist, and the examples presented herein are not intended to limit the scope, applicability, or configuration of the invention in any way. On the contrary, various changes may be made in the function and arrangement of elements described without departing from the scope of the claims and their legal equivalents. Many other modifications and enhancements could be provided in a wide array of alternate but equivalent embodiments.

What is claimed is:

1. A method for implementing voice search for media content, the method comprising:
   applying a server based natural language processing (NLP) in communication with a control system to convert a voice request to text wherein the voice request is sent from a local device which is coupled to the control system and configured with a capability to capture and send the voice request to the control system;
   creating a first search handler to execute a search action to identify contextual data associated with the text to implement the search action in a media database;
   tagging at least one media content identified by the first search handler in the search action of the media database wherein the search action is based on the contextual data associated with the text of the voice request wherein the media content is located at the media database in communication with the control system;
   displaying a list of media content that has been tagged by the first search handler of the control system comprising at least one video scene that is selected for display at the local device; and
   in response to the at least one video scene selected from the tagged list of media content, playing the at least one video scene selected at the local device.

2. The method of claim 1, further comprising:
   tagging the at least one media content comprising content of interest identified by the first search handler in the search action of the media database wherein the search action is based on the content of interest associated with the text of the voice request wherein the media content of interest is located at the media database in communication with the control system.

3. The method of claim 2, further comprising:
   creating a second search handler to execute the search action to identify subtitle data associated with the text to implement the search action in the media database to identify the media content associated with the subtitle data.

4. The method of claim 3, further comprising:
   creating a third search handler to execute the search action to identify close caption data associated with the text to implement the search action in the media database to identify the media content associated with the close caption data.

5. The method of claim 4, further comprising:
   creating a searchable index of media content based on tagged results by one of the first, second, and third search handlers executed by the control system.

6. The method of claim 5, further comprising:
   creating a presentation layer to display comprising an array of thumbnail images of scenes that have been discovered by one of the first, second and third search handler search actions.

7. The method of claim 6, further comprising:
   executing at least one search action by the first, second and third search handlers to generate the searchable index of media content.

8. The method of claim 7, further comprising:
   playing at least one scene by executing a script associated with the media content selected at the local device.

9. A system for processing voice requests for identifying media content in streaming media for display, comprising:
   a local device; and
   at least one server configured to:
   apply a natural language processing (NLP) application to convert a voice request to text wherein the voice request is sent from the local device to the server;
   create a first search handler to execute a search action to identify contextual data associated with the text to implement the search action in a media database;
   tag at least one media content identified by the first search handler in the search action of the media database wherein the search action is based on the contextual data associated with the text of the voice request wherein the media content is located at the media database in communication with a control system;
   display a list of media content that has been tagged by the first search handler of the control system comprising at least one video scene that is selected for the display at the local device; and
   in response to the at least one video scene selected from the tagged list of media content, stream the selected at least one video scene at the local device.

10. The system of claim 9, further comprising:
the server configured to:
tag the at least one media content comprising content of interest identified by the first search handler in the search action of the media database wherein the search action is based on media data of interest associated with the text of the voice request wherein the media content of interest is located at the media database in communication with the server.

11. The system of claim 10, further comprising:
the server configured to:
create a second search handler to execute a search action to identify subtitle data associated with the text to implement the search action in a media database to identify the media content associated with the subtitle data.

12. The system of claim 11, further comprising:
the server configured to:
create a third search handler to execute a search action to identify close caption data associated with the text to implement the search action in a media database to identify the media content associated with the close caption data.

13. The system of claim 12, further comprising:
the server configured to:
create a searchable index of media content based on tagged results by one of the first, second, and third search handlers.

14. The system of claim 13, further comprising:
the server configured to:
create a presentation layer for the display at the local device comprising an array of thumbnail images of scenes that have been discovered by one of the first, second and third search handler search actions.

15. The system of claim 14, further comprising:
the server configured to:
execute at least one search action by the first, second and third search handlers to generate the searchable index of media content.

16. The system of claim 15, further comprising:
the server configured to:
stream at least one scene by executing a script associated with the media content selected at the local device.

17. An apparatus to display a scene contained in streamed media based on a voice search of media content, the apparatus utilizing at least one server in communication with a client device to receive a voice request and to have access to a media database to retrieve streamed media to display, the apparatus comprising:
at least one server configured for voice-to-text search of media content in streaming media based on the voice request from the client device, and the server configured to:
apply a natural language processing (NLP) application to convert the voice request to text wherein the voice request is sent from the client device to the server;
create a search handler to execute a search action to identify data associated with the text to implement a search action in the media database;
tag at least one media content identified by the search handler in the search action of the media database wherein the search action is based on the data associated with the text of the voice request;
display a list of media content that has been tagged by the search handler of a control system comprising at least one scene that is selected for display at the client device; and
in response to the at least one scene selected from a tagged list of streamed media, stream the at least one scene selected at the client device.

18. The apparatus of claim 17, further comprising:
the server configured to:
tag the at least one media content comprising content of interest identified by the search handler in the search action of the media database wherein the search action is based on the content of interest associated with the text of the voice request.

19. The apparatus of claim 18, further comprising:
the server configured to:
creating another search handler to execute a search action to identify subtitle data associated with the text to implement the search action in the media database to identify the media content associated with the subtitle data.

20. The apparatus of claim 19, further comprising:
the server configured to:
creating another search handler to execute a search action to identify close caption data associated with the text to implement the search action in the media database to identify the media content associated with the close caption data.

* * * * *